(12) United States Patent
Lee (10) Patent No.: US 9,917,831 B2
(45) Date of Patent: Mar. 13, 2018

(54) IMAGE FORMING APPARATUS AND METHOD OF AUTHENTICATING USER THEREOF

(71) Applicant: S-PRINTING SOLUTION CO., LTD., Suwon-si, Gyeonggi-do (KR)

(72) Inventor: Kwang-woo Lee, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/445,246

(22) Filed: Jul. 29, 2014

(65) Prior Publication Data

US 2015/0040202 A1 Feb. 5, 2015

(30) Foreign Application Priority Data

Aug. 1, 2013 (KR) .................. 10-2013-0091635

(51) Int. Cl.
*H04L 29/06* (2006.01)
*H04L 9/32* (2006.01)
*G06F 21/31* (2013.01)

(52) U.S. Cl.
CPC .......... *H04L 63/0838* (2013.01); *G06F 21/31* (2013.01); *H04L 9/32* (2013.01)

(58) Field of Classification Search
CPC ........ H04L 63/0838; H04L 9/32; G06F 21/31
USPC .................. 726/2, 4, 5, 7, 26, 28; 705/51
See application file for complete search history.

(56) References Cited

U.S. PATENT DOCUMENTS

| | | | |
|---|---|---|---|
| 8,108,903 B2 * | 1/2012 | Norefors et al. .................. 726/2 |
| 8,130,961 B2 * | 3/2012 | MacHani et al. ............. 380/277 |
| 8,191,118 B2 * | 5/2012 | Kim et al. ......................... 726/4 |
| 8,749,821 B2 * | 6/2014 | Godavari et al. ............ 358/1.15 |
| 8,887,262 B1 * | 11/2014 | Turner et al. .................... 726/10 |
| 2007/0086051 A1 * | 4/2007 | Kunori .......................... 358/1.15 |
| 2007/0136483 A1 | 6/2007 | Lee et al. |
| 2008/0022399 A1 * | 1/2008 | Takano .......................... 726/21 |
| 2009/0207434 A1 * | 8/2009 | Tanaka ......................... 358/1.14 |
| 2010/0014110 A1 * | 1/2010 | Munetomo .................. 358/1.14 |
| 2010/0115465 A1 * | 5/2010 | Lu ............................ G06F 21/31 715/810 |
| 2011/0060913 A1 * | 3/2011 | Hird ........................ G06F 21/34 713/184 |
| 2011/0082767 A1 * | 4/2011 | Ryu ....................... G06Q 20/32 705/26.35 |
| 2011/0283103 A1 * | 11/2011 | Eyal et al. ..................... 713/156 |
| 2012/0124651 A1 * | 5/2012 | Ganesan ................. G06F 21/31 726/4 |

(Continued)

FOREIGN PATENT DOCUMENTS

JP 2011-198017 10/2011
KR 100664308 1/2007

*Primary Examiner* — Sarah Su
(74) *Attorney, Agent, or Firm* — Staas & Halsey LLP (57) ABSTRACT

A method of authenticating a user of an image forming apparatus is provided that includes receiving, at the image forming apparatus, a one-time password (OTP) generating request, generating, at the image forming apparatus, an OTP according to the OTP generating request, receiving, at the image forming apparatus, an authentication request, from the host apparatus, including the OTP, and when the OTP received from the host apparatus matches the OTP generated according to the OTP generating request and absent a condition, approving an access to the image forming apparatus.

15 Claims, 10 Drawing Sheets

(56) References Cited

U.S. PATENT DOCUMENTS

| | | | |
|---|---|---|---|
| 2012/0323717 A1* | 12/2012 | Kirsch | G06Q 20/0855 705/26.1 |
| 2013/0155449 A1* | 6/2013 | Fernandes et al. | 358/1.15 |
| 2013/0185779 A1* | 7/2013 | Tamai | G06F 21/36 726/6 |
| 2013/0227262 A1* | 8/2013 | Maya | G06F 21/575 713/2 |
| 2013/0227677 A1* | 8/2013 | Pal | G06F 21/33 726/19 |
| 2013/0254036 A1* | 9/2013 | Trinh | G06O 30/0251 705/14.64 |
| 2014/0053281 A1* | 2/2014 | Benoit et al. | 726/29 |
| 2014/0098398 A1* | 4/2014 | Hobbs | 358/1.15 |
| 2014/0109211 A1* | 4/2014 | Suzuki | G06F 21/35 726/7 |
| 2014/0253943 A1* | 9/2014 | Mandaknale et al. | 358/1.14 |
| 2014/0351589 A1* | 11/2014 | Chenna | 713/168 |
| 2015/0040202 A1* | 2/2015 | Lee | H04L 63/0838 726/7 |
| 2015/0339670 A1* | 11/2015 | Shaked | H04L 9/3228 705/44 |

\* cited by examiner

FIG. 1
CONVENTIONAL

FIG. 2
CONVENTIONAL

FIG. 3
CONVENTIONAL

FIG. 4
CONVENTIONAL

PLEASE, INPUT FIRST TWO DIGITS OF 28TH SECURITY CARD NUMBER ☐ • •

AND BACK TWO DIGITS OF 4TH SECURITY CARD NUMBER • • ☐

DIRECT INPUT IS POSSIBLE IN SECURITY CARD INPUT WINDOW.

NO. • • • • • • • •

CODE TABLE

| 1 | • • • • | 8 | • • • • | 15 | • • • • | 22 | • • • • | 29 | • • • • |
|---|---|---|---|---|---|---|---|---|---|
| 2 | • • • • | 9 | • • • • | 16 | • • • • | 23 | • • • • | 30 | • • • • |
| 3 | • • • • | 10 | • • • • | 17 | • • • • | 24 | • • • • | 31 | • • • • |
| 4 | • • ☐ | 11 | • • • • | 18 | • • • • | 25 | • • • • | 32 | • • • • |
| 5 | • • • • | 12 | • • • • | 19 | • • • • | 26 | • • • • | 33 | • • • • |
| 6 | • • • • | 13 | • • • • | 20 | • • • • | 27 | • • • • | 34 | • • • • |
| 7 | • • • • | 14 | • • • • | 21 | • • • • | 28 | ☐ • • | 35 | • • • • |

810 — OTP : 3725KW212
820 — Time : 2013-04016 10:47
830 — Model Name : CLX-9350

FIG. 9

IMAGE FORMING APPARATUS AND METHOD OF AUTHENTICATING USER THEREOF

CROSS-REFERENCE TO RELATED APPLICATIONS

This application claims the benefit of priority under 35 U.S.C. § 119 to Korean Patent Application No. 10-2013-0091635, filed on Aug. 1, 2013, in the Korean Intellectual Property Office, the content of which is incorporated herein in its entirety by reference.

BACKGROUND OF THE INVENTION

1. Field of the Invention

An embodiment of the present general inventive concept relates to an image forming apparatus and a method of authenticating a user thereof, and more particularly, to an image forming apparatus that authenticates an access to the image forming apparatus by using a one-time password (OTP) generated according to a request of a user to enhance security of the image forming apparatus, and a method of authenticating the user thereof.

2. Description of the Related Art

Image forming apparatuses that have been recently released provide embedded web services to allow users or managers to conveniently set or manage output devices.

An embedded web service refers to a service that displays a webpage that may set or manage an image forming apparatus if a host apparatus connected to the image forming apparatus obtains an Internet Protocol (IP) access to the image forming apparatus through a network.

Figure 1:
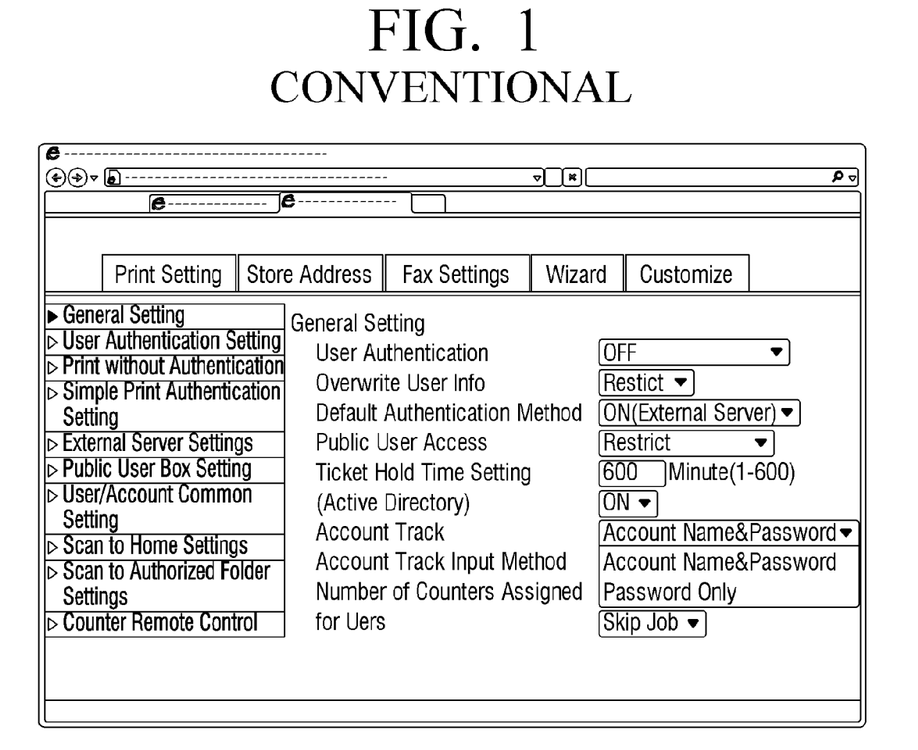
FIG. 1 is a view illustrating a conventional window for an embedded web service.

FIG. 1 is a view illustrating a conventional window for an embedded web service.

A manager or a user may use an embedded web service provided by an image forming apparatus to check a state of the image forming apparatus, set a product (a whole system, printer, copy, fax, scan, an-email function, etc.), set a network (Transmission Control Protocol (TCP), Web Services for Devices (WSD), Service Location Protocol (SLP), Universal Plug ad Play (UPnP), multicast Domain Name System (mDNS), Simple Network Management Protocol (SNMP), Hypertext Transfer Protocol (HTTP), or Simple Mail Transfer Protocol (SMTP)), set system security (function management, information hiding, product re-booting, etc.), and manage network security (authentication, authority, account, or user profile), system log, system backup/restoration, firmware, etc.

Therefore, if a setting authority to an output device is provided to an unauthorized user, a serious problem may occur in terms of security.

Figure 2:
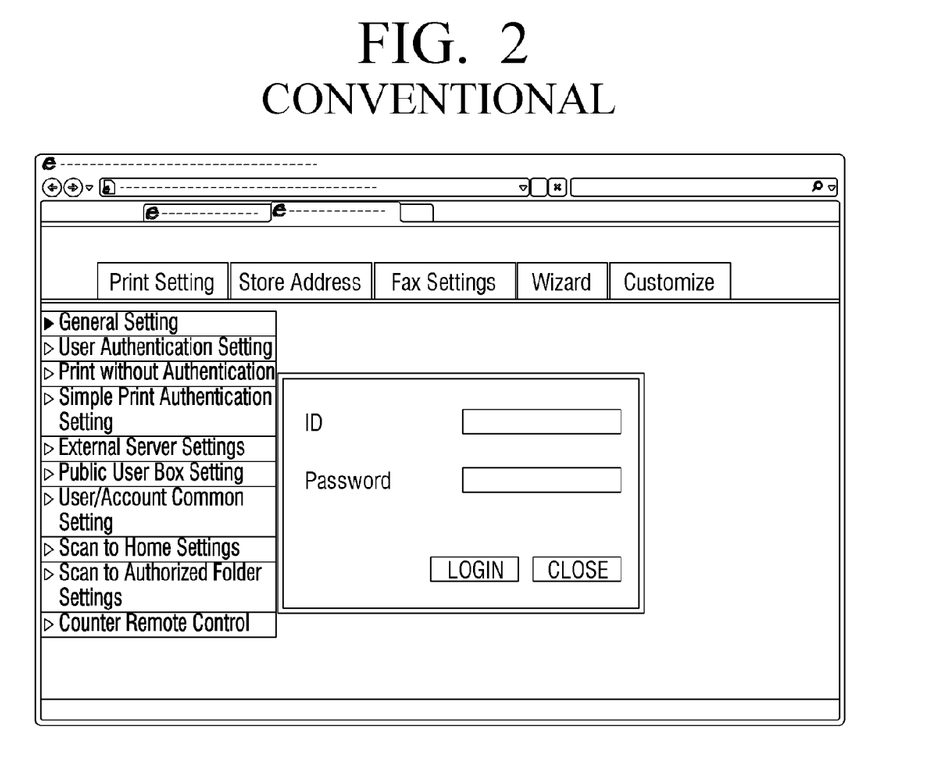
FIGS. 2 through 4 are views illustrating conventional windows used to access embedded web services.
Figure 3:
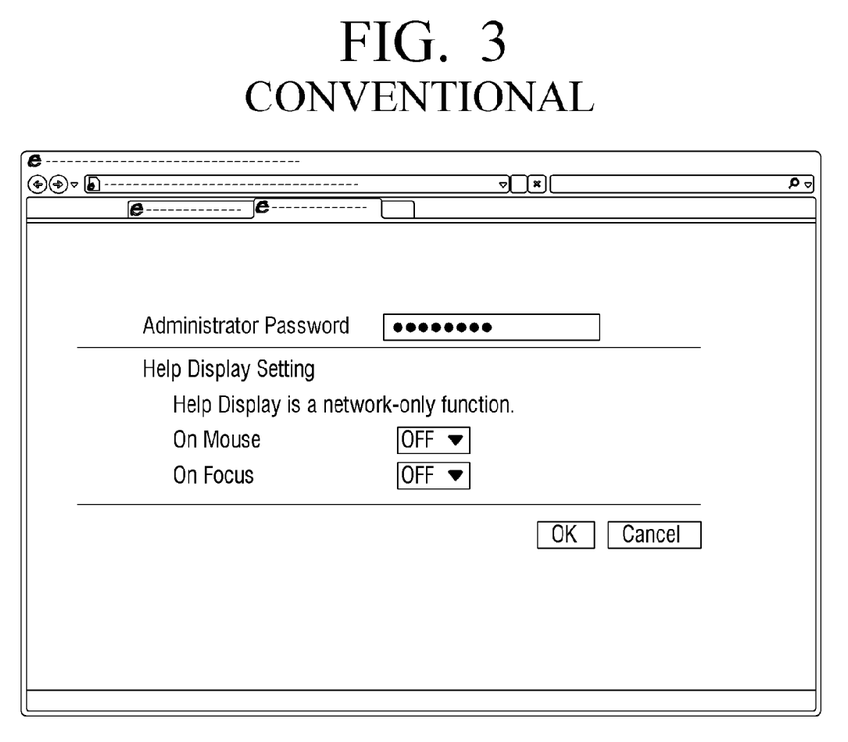
Figure 4:
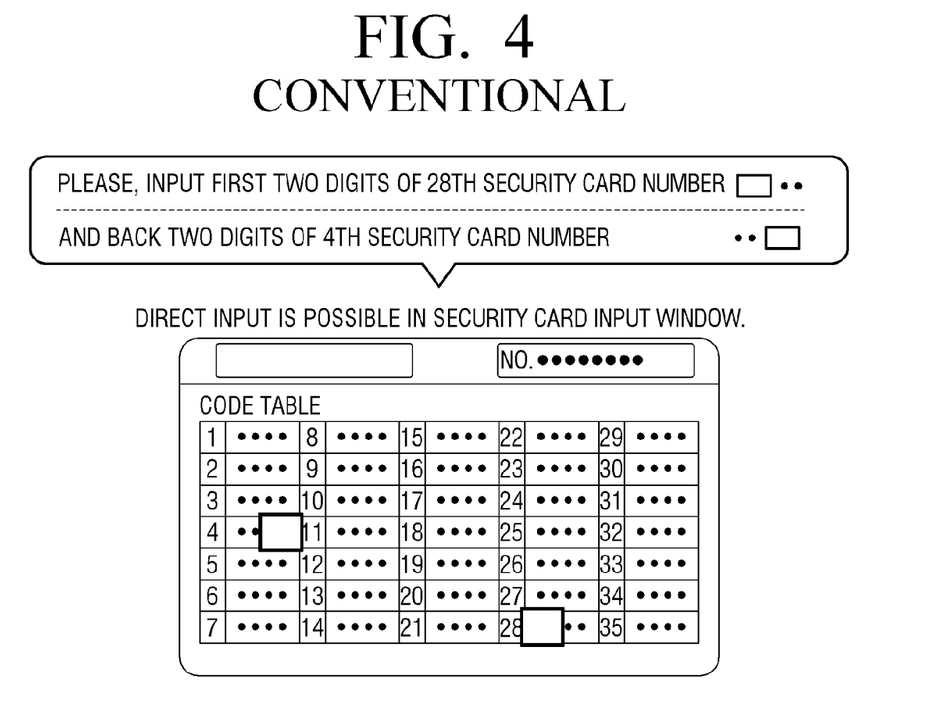

FIGS. 2 through 4 are views illustrating conventional windows used to access embedded web services.

FIGS. 2 and 3 illustrating conventional windows used to input an IP address of an image forming apparatus into a domain address space and for a user or manager to input an ID and a password into a pop-up window in order to access an embedded web service. FIG. 4 illustrates a conventional window to access an embedded web service by using a pre-issued security card.

However, in these methods, an unauthorized malicious user may steal an ID and a password or a security card of a manager to try to access to an embedded web service, and attempt a spinning attack at tapping data transmitted through a network, attempt an attack method through social engineering hacking, attempt an attack method through a password supposition, and/or attempt to gain access based on an initial factory setting value.

Therefore, if a user neglects to manage information about the image forming apparatus, information about the image forming apparatus may be exposed to access by an unauthorized user anytime.

As a result, there is a need for a method of authenticating an embedded web service manager of an image forming apparatus and a method of improving a system to prevent a hacking accident as described above.

SUMMARY OF THE INVENTION

Embodiments of the present general inventive concept address at least the above problems and/or disadvantages and other disadvantages not described above. Also, the embodiments of the present general inventive concept are not required to overcome the disadvantages described above, and an embodiment may not overcome any of the problems described above.

The present general inventive concept provide an image forming apparatus that generates a one-time password (OTP) according to a request of a user such that, if the user who has checked the OTP requests authentications of the one-time password, the user checks an OTP transmitted from the user and a generated OTP to authenticate an access only if the transmitted OTP matches with the generated OTP, and a method of authenticating a user of the image forming apparatus.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of authenticating a user of an image forming apparatus connected to a host apparatus through a network. The method may include receiving, at the image forming apparatus, a one-time password (OTP) generating request, generating, at the image forming apparatus, an OTP according to the OTP generating request, receiving, at the image forming apparatus, an authentication request, from the host apparatus, including the OTP, and when the OTP received from the host apparatus matches the OTP generated according to the OTP generating request and absent a condition, approving, by the image forming apparatus, an access to the image forming apparatus.

The condition may include an OTP that has previously been used and the method may further include, when the authentication request including the OTP is received that satisfies the condition, disapproving the access to the image forming apparatus.

The condition may include a number of uses of the OTP that exceeds a preset limit and the method may further include, when the authentication request including the OTP is received that satisfies the condition, disapproving the access to the image forming apparatus.

The condition may include a date later than a preset expiration date of the OTP and the method may further include, when the authentication request including the OTP is received that satisfies the condition, disapproving the access to the image forming apparatus.

The method may further include displaying, at the image forming apparatus, the OTP generated according to the OTP generating request.

The method may further include outputting, from the image forming apparatus, the OTP generated according to the OTP generating request.

The method may further include transmitting, from the image forming apparatus, the OTP generated according to the OTP generating request by using at least one method of Short Message Service (SMS), e-mail, and facsimile. The method may further include converting the OTP generated according to the OTP generating request into a quick response (QR) code and transmitting the QR code.

The foregoing and/or other features and utilities of the present inventive concept also provide an image forming apparatus configured to be connected to a host apparatus through a network. The image forming apparatus may include a controller configured to generate a one-time password (OTP) according to an OTP generating request, and a communicator configured to receive an authentication request, from the host apparatus, comprising the OTP. When the OTP received from the host apparatus matches the OTP generated according to the OTP generating request and absent a condition, the controller may approve an access to the image forming apparatus.

The condition may include an OTP that has previously been used and, when the authentication request including the OTP is received that satisfies the condition, the controller disapproves the access to the image forming apparatus.

The condition may include a number of uses of the OTP that exceeds a preset limit and, when the authentication request including the OTP is received that satisfies the condition, the controller disapproves the access to the image forming apparatus.

The condition may include a date later than a preset expiration date of the OTP and, when the authentication request including the OTP is received that satisfies the condition, the controller disapproves the access to the image forming apparatus.

The image forming apparatus may further include a display unit configured to display the OTP generated according to the OTP generating request.

The image forming apparatus may further include an image former configured to print the OTP generated according to the OTP generating request.

The communicator may be further configured to transmit the OTP generated according to the OTP generating request by using at least one method of Short Message Service (SMS), e-mail, and facsimile. The controller may be further configured to convert the OTP into a quick response (QR) code, and the communicator may be further configured to transmit the QR code.

The foregoing and/or other features and utilities of the present inventive concept also provide a non-transitory computer-readable recording medium containing instructions which, when executed by a controller, cause the controller to perform a method. The method may include receiving, at the controller, a one-time password (OTP) generating request, generating, at the controller, an OTP according to the OTP generating request, receiving, at the controller, an authentication request, from the host apparatus, comprising the OTP, and when the OTP received from the host apparatus matches the OTP generated according to the OTP generating request and absent a condition, approving, by the controller, an access to the image forming apparatus.

The foregoing and/or other features and utilities of the present inventive concept also provide an electronic apparatus that includes a transceiver configured to receive, from a second electronic apparatus via a first communication protocol, a first request and a second request, and a processor configured to produce a first password in response to the first request, to make a comparison between the first password and a second password included in the second request, and to control access to the electronic apparatus based on a result of the comparison and absent a condition.

The condition may include at least one of a number of uses of the second password exceeds a preset limit and a date later than a preset expiration date of the second password. The processor may be configured to prevent access to the electronic apparatus in response to information in the second request that satisfies the condition.

The transceiver may be further configured to transmit the first password to a user of the second electronic apparatus via a second communication protocol that excludes the second electronic apparatus.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the embodiments. Thus, it is apparent that the embodiments may be carried out without those specifically defined matters. Also, well-known functions or constructions are not described in detail since they would obscure the embodiments with unnecessary detail.

Figure 5:
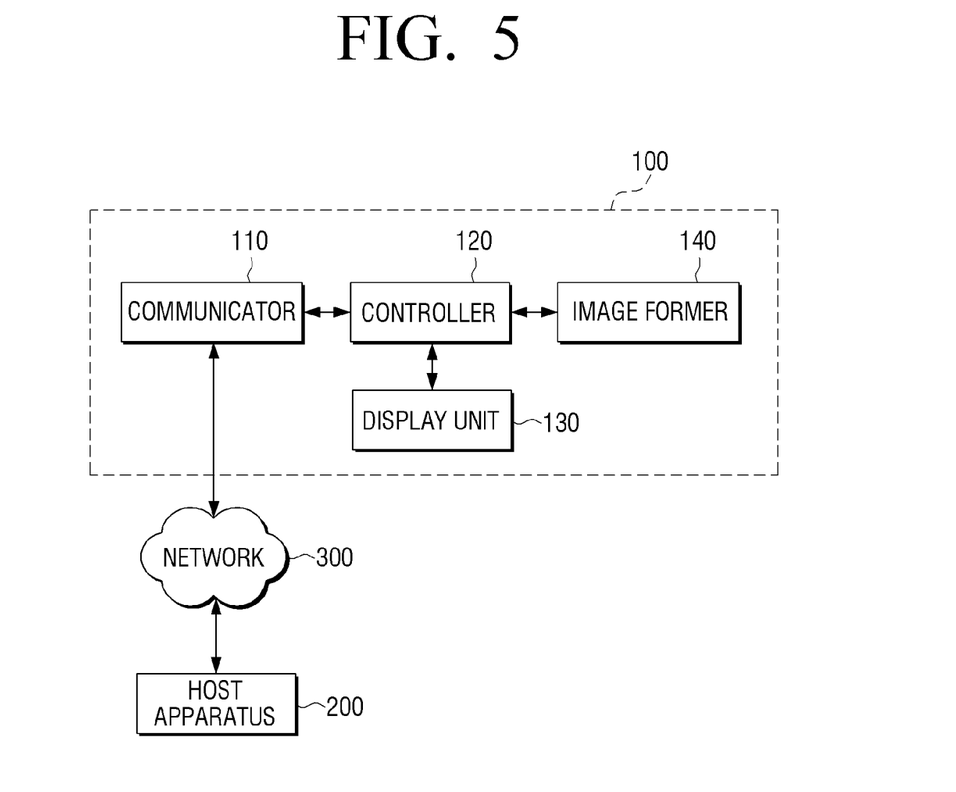
FIG. 5 is a block diagram illustrating an image forming apparatus according to an embodiment of the present general inventive concept.

FIG. 5 is a block diagram illustrating an image forming apparatus 100 according to an embodiment of the present general inventive concept.

Referring to FIG. 5, the image forming apparatus 100 may include a communicator 110 and a controller 120.

The image forming apparatus 100 illustrated in FIG. 5 includes only elements related to an embodiment of the present general inventive concept. Those skilled in the art understand that the image forming apparatus 100 may further include other general-purpose elements besides the elements illustrated in FIG. 5.

The communicator 110 may receive an authentication request that includes a one-time password (OTP) from a host apparatus 200.

For example, if a user activates a webpage to access the image forming apparatus 100 and inputs an Internet Protocol (IP) address of the image forming apparatus 100, a webpage that provides an embedded web service may be displayed, and a space into which an identifier (ID) and a password of a manager may be input and an OTP generating button may also be displayed.

If the user presses the OTP generating button, a request to generate an OTP may be transmitted to the image forming apparatus 100.

The controller 120 may generate an OTP according to the request to generate the OTP. According to an embodiment of the present general inventive concept, the OTP may be, for example, a letter string in which letters, numbers, and symbols may be arbitrarily combined.

The image forming apparatus 100 may further include a display unit 130 that may display various types of information to the user. The generated OTP, for example, may be displayed on the display unit 130.

For example, the display unit 130 may display the generated OTP and a button that may be used to print the generated OTP. If the user presses the button, the generated OTP may be printed through an image former 140.

Alternatively, the image forming apparatus 100 may not include the display unit 130. In this case, if the user or the manager presses the OTP generating button in the host apparatus 200, the generated OTP may be immediately output through the image former 140.

Alternatively, in order to further enhance security, a Short Message Service (SMS) message may be transmitted to a preset portable phone (not illustrated) or the OTP may be transmitted to the user by using at least one of e-mail or facsimile so as not to expose the OTP generated according to the request of the user to others.

For example, the generated OTP may be directly transmitted or may be converted into a quick response (QR) code, and then the QR code may be transmitted so as not to expose the OTP to others.

If the user checks the generated OTP, returns to the host apparatus 200 to input the generated OTP into an embedded web service page, and requests authentication, the controller 120 of the image forming apparatus 100 may check whether the OTP generated according to the request of the user matches with the OTP that has been used for the request for the authentication and, if it is determined that the generated OTP matches with the used OTP, the controller 120 may authenticate access by the user.

The above-described OTP may be newly issued whenever the user accesses the embedded web service to use image forming apparatus 100.

If the user uses an issued OTP for a long time, the issued OTP may be exposed to others. Therefore, if the user tries to re-access the image forming apparatus 100 with an OTP that has been used once, an authentication request of the user may not be approved.

Alternatively, in order to solve the problem of issuing an OTP whenever the user logs into the embedded web service, the number of log-ins allowed with a single OTP may be preset to not to authenticate the authentication request of the user if the number of uses exceeds the preset number of times.

In addition to limiting the number of uses of an OTP as a method to manage an OTP, an expiration date of the OTP may also be set to manage the OTP.

For example an OTP generated according to a request of a user may be used only within a preset expiration date. Also, if an authentication request is made with an OTP whose expiration date has elapsed, the authentication request may not be approved.

As described above, the number of uses of an OTP or an expiration date of the OTP may be set and managed not to authenticate an authentication request of an OTP whose expiration date has elapsed, thereby enhancing security in at least a case in which the OTP has been exposed to others.

Figure 6:
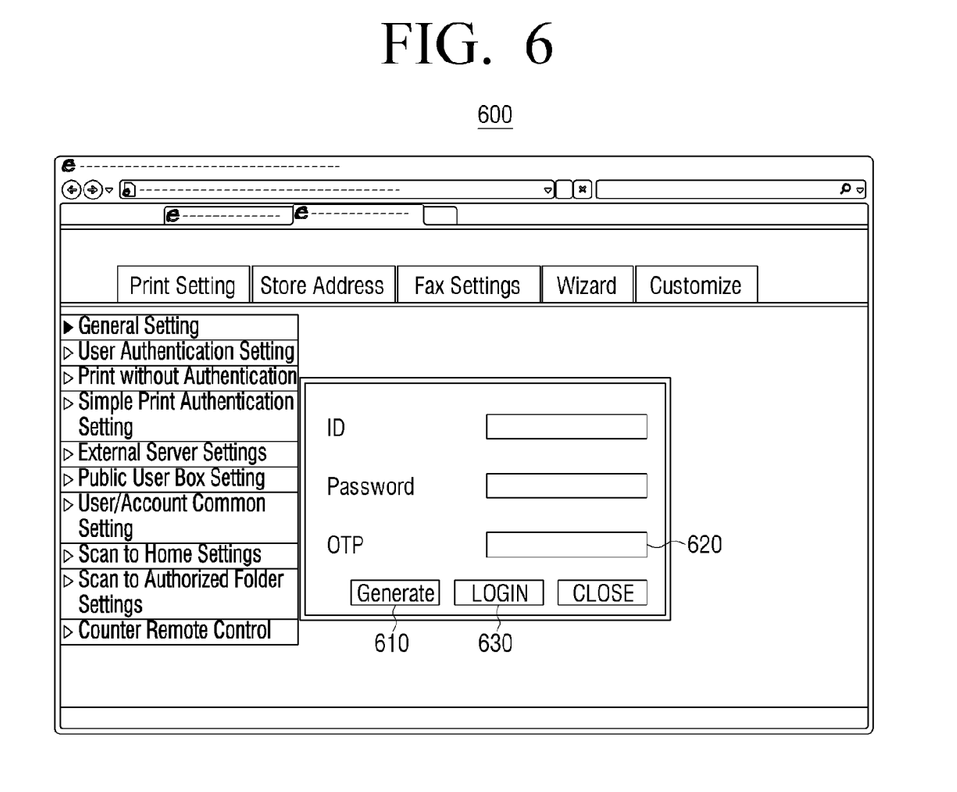
FIG. 6 is a view illustrating an embedded web service log-in window according to an embodiment of the present general inventive concept.

FIG. 6 is a view illustrating an embedded web service log-in window 600 according to an embodiment of the present general inventive concept.

If an IP address of the image forming apparatus 100, connected to the host apparatus 200 (see FIG. 5) through a network 300 (see FIG. 5) is input into a domain address space after a user or a manager executes a webpage in the host apparatus 200, the embedded web service log-in window 600 may be displayed.

The embedded web service log-in window 600 may display spaces into which an ID and a password of an existing user or manager may be input, an OTP generating button 610, and an OTP input space 620.

In the embodiment illustrated in FIGS. 5-8, an OTP may be displayed. However, this may be only a difference of expression, and thus its meaning may be the same as the above-described OTP.

If the user selects the OTP generating button 610, an OTP generating request may be transmitted to the image forming apparatus 100, and an OTP may be generated by the controller 120 of the image forming apparatus 100.

The generated OTP may be displayed on the display unit 130 of the image forming apparatus 100 or may be printed as a printout through the image former 140.

If the user or manager moves to the image forming apparatus 100 to check the generated OTP, inputs the generated OTP into the OTP input space 620 of the embedded web service log-in window 600, and presses a log-in button 630, an authentication request may be transmitted to the image forming apparatus 100.

The image forming apparatus 100 may check whether an OTP transmitted from the host apparatus 200 matches with the generated OTP and, if it is determined that the transmitted OTP matches with the generated OTP, the image forming apparatus 100 may approve the authentication request of the user.

In the embodiment illustrated in FIGS. 5-8, an ID and a password of an existing user may, for example, be input along with an OTP. However, only an OTP generated according to a request of a user may be input without inputting the ID and the password of the existing user.

If an OTP input by a user has been used, has been used a number of times that exceed the preset number of uses, or a preset expiration date has elapsed, an authentication request that includes the OTP may not be approved.

For example, an OTP may be generated for a user or a manager who may physically access the image forming apparatus 100 to approve only an authentication request that includes the OTP in order to enhance security of an embedded web service.

Figure 7:
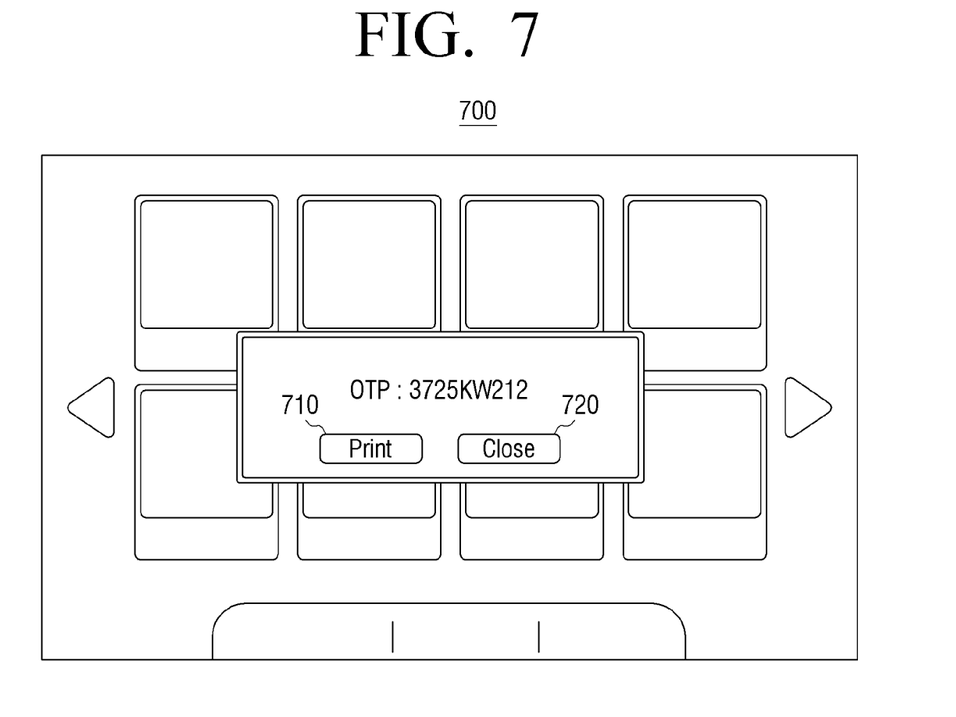
FIG. 7 is a view illustrating a window displayed on a display unit of the image forming apparatus according to an embodiment of the present general inventive concept.

FIG. 7 is a view illustrating a window 700 displayed on the display unit 130 of the image forming apparatus 100 according to an embodiment of the present general inventive concept.

If a user transmits an OTP generating request from the host apparatus 200, the controller 120 may generate an arbitrary OTP in which numbers, letters, and symbols may be combined and may display the arbitrary OTP on the display unit 130.

Also, for convenience of the user, the window 700 may include a print button 710 and a window close button 720. If the user selects the print button 710, an OTP may be generated through the image former 140 (see FIG. 5). If the user checks the OTP and then selects the window close button 720, the generated OTP may disappear.

In the embodiment illustrated in FIGS. 5-8, the image forming apparatus 100 may include the display unit 130, and thus a generated OTP may be displayed through the display unit 130. Alternatively, the image forming apparatus 100 may not include the display unit 130.

In this case, if the user transmits an OTP generating request from the host apparatus 200, the OTP may be output through the image former 140 of the image forming apparatus 100.

Figure 8:
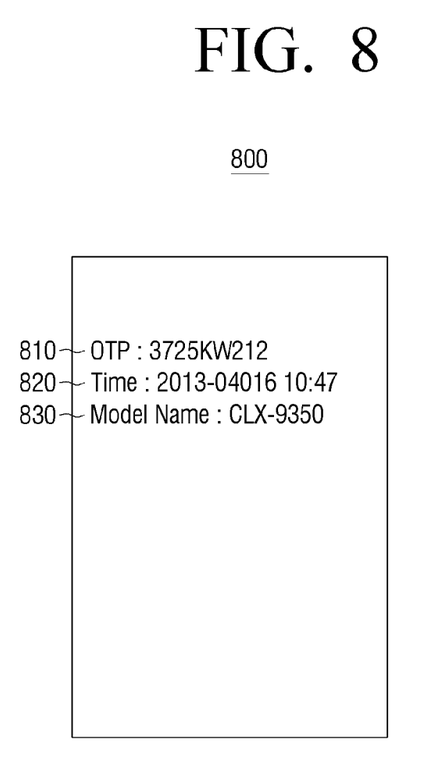
FIG. 8 is a view illustrating an output that includes an OTP according to an embodiment of the present general inventive concept.

FIG. 8 is a view illustrating an output 800 that includes an OTP according to an embodiment of the present general inventive concept.

If a user or a manger selects the print button 710 to output an OTP displayed on the display unit 130 of the image forming apparatus 100 or immediately outputs the OTP because the image forming apparatus 100 does not include the display unit 130, the output 800 may be as illustrated in FIG. 8.

In the embodiment illustrated in FIGS. 5-8, the output 800 may include an OTP 810. As illustrated in FIG. 8, the OTP 810 may be an arbitrary combination of numbers and/or letters. Although not illustrated in FIG. 8, the OTP 810 may further include symbols besides numbers or letters.

The output 800 may also include an expiration date 820 that may refer to a period of time during which the user may access the image forming apparatus 100 by using the OTP 810. If the expiration date 820 has elapsed and the user tries an authentication request with the OTP 810, the authentication request may not be approved.

The output 800 may also include a model name 830 that may be associated with the image forming apparatus 100 that may be accessed by using the OTP 810.

Figure 9:
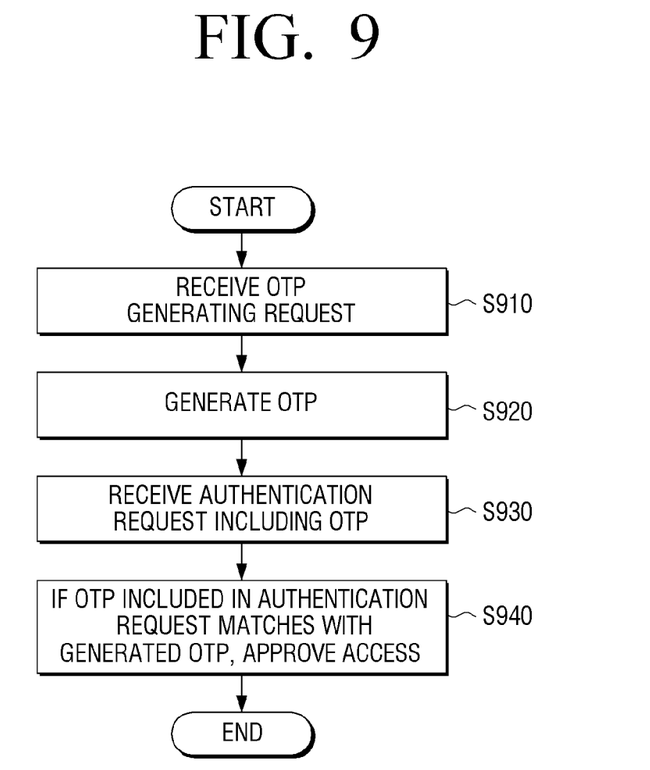
FIG. 9 is a flowchart illustrating a method of authenticating a user of the image forming apparatus according to an embodiment of the present general inventive concept.

FIG. 9 is a flowchart illustrating a method of authenticating a user of the image forming apparatus 100 according to an embodiment of the present general inventive concept.

A user or a manager may execute a webpage in the host apparatus 200 to input an IP address of the image forming apparatus 100 into a domain address space. The embedded web service log-in window 600 (see FIG. 6) may be displayed to provide an embedded web service, and the OTP generating button 610 may be included in the embedded web service log-in window 600.

If the user or the manager selects the OTP generating button 610, an OTP generating request may be transmitted to the image forming apparatus 100 in an operation S910.

In an operation S920, the controller 120 of the image forming apparatus 100 that has received the OTP generating request from the host apparatus 200 may generate an OTP in which, for example, arbitrary numbers, letters, or symbols may be combined.

In an operation S930, the user or the manager may move to the image forming apparatus 100 to check an OTP that may be displayed on the display unit 130 of the image forming apparatus 100 or may be printed through the image former 140, and may transmit an authentication request from the host apparatus 200.

In an operation S940, the controller 120 of the image forming apparatus 100 may compare an OTP generated according to a request of the user with an OTP included in the authentication request and, if the controller 120 determines that the generated OTP matches the OTP of the authentication request, the controller 120 may approve access by the user or the manager.

As described above, for example, an existing ID, an existing password, and an OTP may be generated, and a user or a manager who is physically adjacent to the image forming apparatus 100 may check and input the existing ID, the existing password, and the OTP. Therefore, security of the image forming apparatus 100 may be enhanced.

Figure 10:
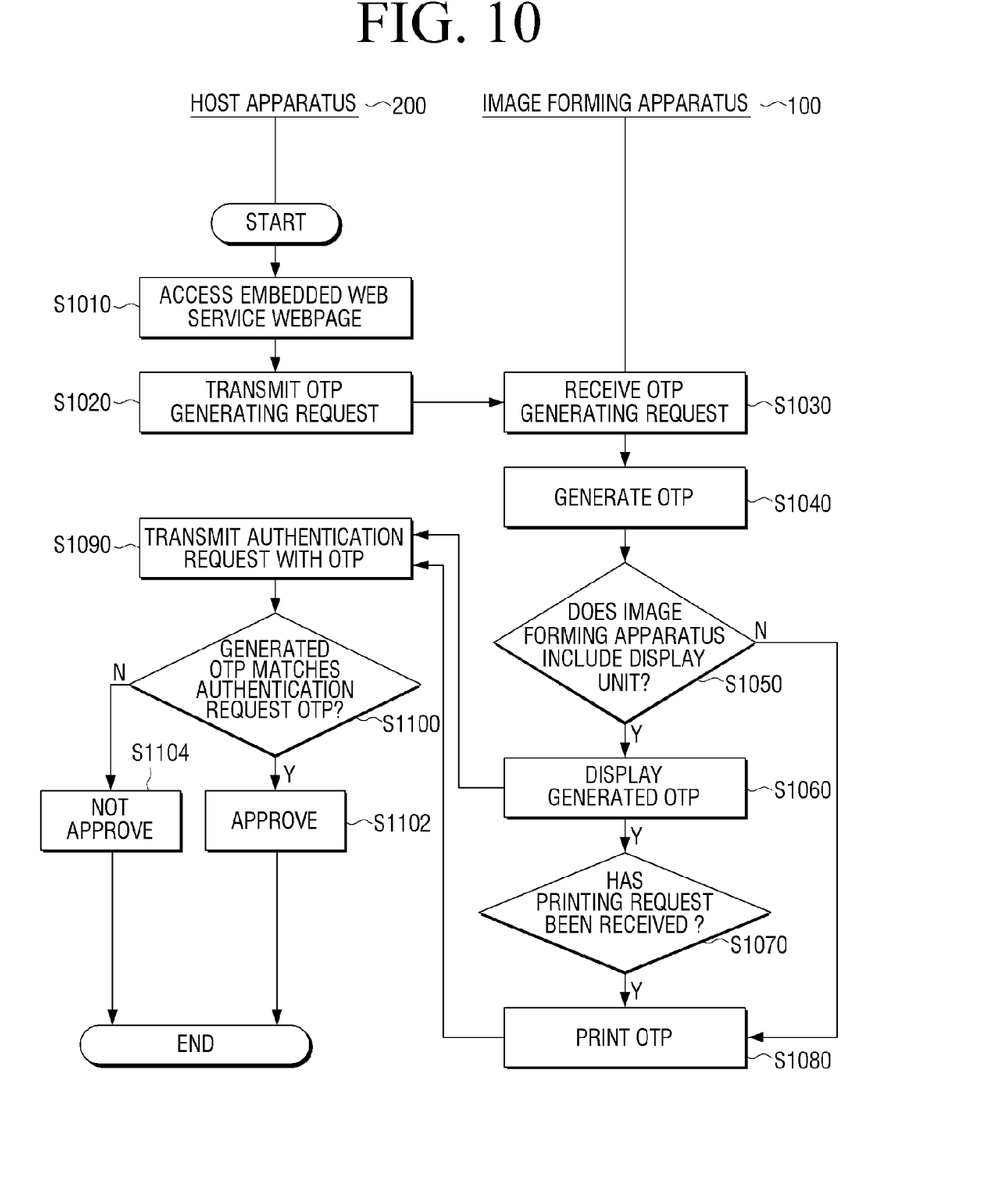
FIG. 10 is a flowchart illustrating, in more detail, the method of authenticating a user of the image forming apparatus according to an embodiment of the present general inventive concept.

FIG. 10 is a flowchart illustrating, in more detail, the method of authenticating a user of the image forming apparatus 100 according to an embodiment of the present general inventive concept.

In an operation S1010, a user may execute a webpage in the host apparatus 200 to input an IP address of the image forming apparatus 100, connected to the host apparatus 200 through the network 300 (see FIG. 5), into a domain address space. In this case, the embedded web service log-in window 600 (see FIG. 6) may be displayed to provide an embedded web service.

The embedded web service log-in window 600 may include, for example, an ID and a password of the user or a manager, the OTP input space 620, into which an OTP generated according to a request of the user may be input, and the OTP generating button 610.

In an operation S1020, the user may select the OTP generating button 610 to transmit an OTP generating request to the image forming apparatus 100. In an operation S1030, the image forming apparatus 100 may receive the OTP generating request. In an operation S1040, the image forming apparatus 100 may generate an OTP.

For example, the generated OTP may be an arbitrary combination of numbers, letters, and/or symbols.

In an operation S1050, a determination may be made as to whether the image forming apparatus 100 includes the display unit 130. If the image forming apparatus 100 includes the display unit 130, the generated OTP may be displayed on the display unit 130 in an operation S1060. If a print command for the generated OTP is input in an operation S1070, the image forming apparatus 100 may print the OTP through the image former 140 in an operation S1080.

However, if the image forming apparatus 100 does not include the display unit 130, the image forming apparatus 100 may print the OTP that is generated according to the OTP generating request of the user, to provide to the user the output 800 (see FIG. 8) that includes the OTP in an operation S1080.

In an operation S1090, the user may transmit an authentication request, including an OTP, from the host apparatus 200. In an operation S1100, the controller 120 of the image forming apparatus 100 may determine whether the generated OTP matches the OTP included in the authentication request. If the generated OTP matches the OTP included in the authentication request, the controller 120 may approve access by the user to the image forming apparatus 100 at an operation S1102. If the generated OTP does not match the OTP included in the authentication request, the controller 120 may not approve access by the user to the image forming apparatus 100 at operation S1104.

If a user authentication is performed by using an OTP as described above, access to the embedded web service may be limited to a user who may physically access the image forming apparatus 100. This authentication method may enhance a level of security over that of a conventional authenticating method.

The present general inventive concept may be written as a program that may be executed in a computer and may be realized in a general-purpose digital computer that operates the program by using a computer-readable recording medium. More generally, the present general inventive concept may be embodied as computer-readable codes on a computer-readable medium. The computer-readable medium may include a computer-readable recording medium and a computer-readable transmission medium. A structure of data used in the present general inventive concept may be recorded in a computer-readable recording medium through several means. The computer-readable recording medium is any data storage device that may store data as a program which may be thereafter read by a computer system. The computer-readable recording medium may include a storage medium such as a magnetic storage medium (for example, read-only memory (ROM), random-access memory (RAM), magnetic tapes, floppy disk, hard disk, or the like) or an optical reading medium (for example, compact disc read-only memory (CD-ROM), digital video disc (DVD), or the like). The computer-readable recording medium may also be distributed over network coupled computer systems so that the computer-readable code is stored and executed in a distributed fashion. The computer-readable transmission medium may be transmitted through carrier waves or signals (e.g., wired or wireless data transmission through the Internet). Also, functional programs, codes, and code segments to accomplish the present general inventive concept may be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of authenticating a user of a first electronic apparatus to communicatively connect to a second electronic apparatus through a computer network, the method comprising:
   receiving, by the first electronic apparatus, a request to generate a one-time password (OTP), the request to generate the OTP transmitted from the second electronic apparatus in response to a request input by the user to generate the OTP through a log-in window associated with the first electronic apparatus and displayed at the second electronic device to generate the OTP;
   generating, by the first electronic apparatus, the OTP according to the request to generate the OTP;
   providing, by the first electronic apparatus, the generated OTP, wherein the generated OTP is usable for a determined plurality of times;
   receiving, by the first electronic apparatus, an authentication request including an input by the user to use the first electronic apparatus, from the second electronic apparatus, in response to the input by the user through the log-in window associated with the first electronic apparatus and displayed at the second electronic apparatus to use the first electronic apparatus;
   when the input included in the received authentication request matches the generated OTP that is used for less than or equal to the determined plurality of times, approving, by the first electronic apparatus, a connection between the first electronic apparatus and the second electronic apparatus over the computer network according to the authentication request; and
   when the input included in the received authentication request matches the generated OTP that is used for more than the determined plurality of times or does not match the qenerated OTP, disapproving, by the first electronic apparatus, the connection between the first electronic apparatus and the second electronic apparatus.

2. The method of claim 1, wherein
   the generated OTP is usable for a determined period of time, and
   when the input included in the received authentication request matches the generated OTP that is generated before the determined period of time, disapproving, by the first electronic device, the connection between the first electronic apparatus and the second electronic apparatus.

3. The method of claim 1, wherein the providing, by the first electronic apparatus, the generated OTP comprises displaying, on a display of the first electronic apparatus, the generated OTP generated according to the request to generate the OTP.

4. The method of claim 1, wherein the providing, by the first electronic apparatus, the generated OTP comprises outputting, at the first electronic apparatus, the generated OTP generated according to the request to generate the OTP.

5. The method of claim 1, wherein the providing, by the first electronic apparatus, the generated OTP comprises transmitting, by the first electronic apparatus, the generated OTP generated according to the OTP generating request by using at least one method of Short Message Service (SMS), e-mail, and facsimile.

6. The method of claim 1, further comprising:
   converting, by the first electronic apparatus, the generated OTP generated according to the request to generate the OTP into a quick response (QR) code,
   wherein the providing, by the first electronic apparatus, the generated OTP comprises transmitting, by the first electronic apparatus, the QR code.

7. An electronic apparatus configured to be communicatively connected to a second electronic apparatus through a computer network, the electronic apparatus comprising:
   at least one hardware processor to cause:
      receiving a request to generate a one-time password (OTP), the request to generate the OTP transmitted from the second electronic apparatus in response to a request input by a user to generate the OTP through a log-in window associated with the electronic apparatus and displayed at the second electronic device to generate the OTP;

generating the OTP according to the request to generate the OTP;
providing the generated OTP, wherein the generated OTP is usable for a determined plurality of times;
receiving an authentication request including an input by the user to use the electronic apparatus, from the second electronic apparatus, in response to the input by the user through the log-in window associated with the electronic apparatus and displayed at the second electronic apparatus to use the electronic apparatus;
when the input included in the received authentication request matches the generated OTP that is used for less than or equal to the determined plurality of times, approving a connection between the electronic apparatus and the second electronic apparatus through the computer network according to the authentication request; and
when the input included in the received authentication request matches the generated OTP that is used for more than the determined plurality of times or does not match the generated OTP, disapproving the connection between the electronic apparatus and the second electronic apparatus through the computer network.

8. The electronic apparatus of claim 7, wherein the at least one hardware processor is to further cause:
when the input included in the received authentication request matches the generated OTP that is generated before the period of time, disapproving the connection between the electronic apparatus and the second electronic apparatus through the computer network.

9. The electronic apparatus of claim 7, further comprising:
a display to display the generated OTP,
wherein the providing the generated OTP comprises displaying, on the display, the generated OTP generated according to the request to generate the OTP.

10. The electronic apparatus of claim 7, further comprising:
an image former to print the generated OTP,
wherein the providing the generated OTP at the electronic apparatus comprises controlling the image former to print the generated OTP generated according to the request to generate the OTP.

11. The electronic apparatus of claim 7, wherein the providing, by the electronic apparatus, the generated OTP at the electronic apparatus comprises transmitting the generated OTP generated according to the OTP generating request by using at least one method of Short Message Service (SMS), e-mail, and facsimile.

12. The electronic apparatus of claim 7, wherein:
the at least one processor is to further cause converting the generated OTP into a quick response (QR) code, and
the providing the generated OTP at the electronic apparatus comprises transmitting the QR code.

13. A non-transitory computer-readable recording medium to contain computer-readable codes as a program to execute an authentication method of a first electronic apparatus communicatively connected to a second electronic apparatus through a computer network, the method comprising:
receiving, by the first electronic apparatus, a request to generate a one-time password (OTP), the request to generate the OTP transmitted from the second electronic apparatus in response to a request input by a user to generate the OTP through a log-in window associated with the first electronic apparatus and displayed at the second electronic device to generate the OTP;
generating, by the first electronic apparatus, the OTP according to the request to generate the OTP;
providing, by the first electronic apparatus, the generated OTP, wherein the generated OTP is usable for a determined plurality of times;
receiving, by the first electronic apparatus, an authentication request including an input by the user to use the first electronic apparatus, from the second electronic apparatus, in response to the input by the user through the log-in window associated with the first electronic apparatus and displayed at the second electronic apparatus to use the first electronic apparatus;
when the input included in the received authentication request matches the generated OTP that is used for less than or equal to the determined plurality of times, approving, by the first electronic apparatus, a connection between the first electronic apparatus and the second electronic apparatus over the computer network according to the authentication request; and
when the input included in the received authentication request matches the generated OTP that is used for more than the determined plurality of times or does not match the generated OTP, disapproving, by the first electronic apparatus, the connection between the first electronic apparatus and the second electronic apparatus,
wherein the providing the generated OTP comprises outputting, at the first electronic apparatus, the generated OTP.

14. An electronic apparatus, comprising:
a transceiver to receive, from a second electronic apparatus through a first computer network, a first request and a second request; and
at least one hardware processor to cause:
producing a password in response to the first request, the first request transmitted by the second electronic apparatus in response to a request input by a user to generate the password by a user through a log-in window associated with the electronic apparatus and displayed at the second electronic device to generate the OTP,
providing the produced password, wherein the produced password is usable for a determined plurality of times, which is preset,
receiving the second request containing an input by the user to use the electronic apparatus from the second electronic apparatus, from the second electronic apparatus, in response to the input by the user through the log-in window associated with the electronic apparatus and displayed at the second electronic apparatus to use the electronic apparatus
comparing the produced password with the input by the user, and
when the comparing the produced password with the input by the user indicates that the input matches the produced password that is used less than or equal to the determined plurality of times, approving a connection between the electronic apparatus and the second electronic apparatus through the first computer network according to the second request,
when the comparing the produced password with the input by the user indicates that the input matches the produced password that is used more than the plurality of times, disapproving the connection between the electronic apparatus and the second electronic apparatus through the first computer network.

15. The electronic apparatus of claim 14, wherein the transceiver is to further transmit the produced password through a second computer network that excludes the second electronic apparatus.

* * * * *

UNITED STATES PATENT AND TRADEMARK OFFICE
CERTIFICATE OF CORRECTION

PATENT NO. : 9,917,831 B2
APPLICATION NO. : 14/445246
DATED : March 13, 2018
INVENTOR(S) : Kwang-woo Lee et al.

Page 1 of 1

It is certified that error appears in the above-identified patent and that said Letters Patent is hereby corrected as shown below:

In the Drawings

In FIG. 1, Line 4, delete "Restict" and insert -- Restrict --, therefor.

In FIG. 1, Line 12, delete "Uers" and insert -- Users --, therefor.

In the Claims

Column 10, Claim 1, Line 22, delete "qenerated" and insert -- generated --, therefor.

Column 12, Claim 14, Lines 50-51, after "apparatus," delete "from the second electronic apparatus,".

Signed and Sealed this
Thirty-first Day of July, 2018

Andrei Iancu
*Director of the United States Patent and Trademark Office*